(12) United States Patent
Shustef

(10) Patent No.: US 8,370,482 B2
(45) Date of Patent: Feb. 5, 2013

(54) METHOD AND SYSTEM FOR STORING AND DISTRIBUTING SOCIAL AND BUSINESS CONTACT INFORMATION ONLINE

(75) Inventor: Yevgeniy Shustef, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 519 days.

(21) Appl. No.: 12/627,883

(22) Filed: Nov. 30, 2009

(65) Prior Publication Data

US 2011/0131504 A1 Jun. 2, 2011

(51) Int. Cl.
*G06F 13/00* (2006.01)
(52) U.S. Cl. ............... 709/224; 709/219; 709/250
(58) Field of Classification Search .......... 709/217, 709/219, 223, 224, 225, 250
See application file for complete search history.

(56) References Cited

U.S. PATENT DOCUMENTS

| | | | |
|---|---|---|---|
| 5,835,089 A | 11/1998 | Skarbo et al. | 345/335 |
| 6,157,954 A | 12/2000 | Moon et al. | 709/228 |
| 6,189,026 B1 | 2/2001 | Birrell et al. | 709/206 |
| 6,269,369 B1 | 7/2001 | Robertson | 707/10 |
| 6,442,263 B1 | 8/2002 | Beaton et al. | 379/142.04 |
| 6,564,264 B1 | 5/2003 | Creswell et al. | 709/245 |
| 7,089,287 B2 | 8/2006 | Bellotti et al. | 709/206 |
| 7,925,620 B1 * | 4/2011 | Yoon | 707/609 |
| 2005/0208927 A1 * | 9/2005 | Wong et al. | 455/412.1 |
| 2005/0289474 A1 * | 12/2005 | Master et al. | 715/765 |
| 2007/0081649 A1 * | 4/2007 | Baudino et al. | 379/201.11 |
| 2008/0120183 A1 | 5/2008 | Park | 705/14 |
| 2009/0271409 A1 * | 10/2009 | Ghosh | 707/9 |
| 2010/0144318 A1 * | 6/2010 | Cable | 455/412.1 |

OTHER PUBLICATIONS

R. Wauters; Card.ly Lets You Create Cool Online Business Cards in a Matter of Minutes; TechCrunch, Jul. 20, 2009 Create Your Online Card; http://card.ly/.

* cited by examiner

*Primary Examiner* — Viet Vu
(74) *Attorney, Agent, or Firm* — Kermit D. Lopez; Luis M. Ortiz; Ortiz & Lopez, PLLC

(57) ABSTRACT

An information management and distribution method and system for updating contact information over a network. A plug-in associated with a cloud-based back-end unit interacts with a Web application. A virtual card comprising a set of pluggable user interface components associated with the plug-in can be displayed in a user interface associated with the Web application. The contact information with respect to a user can be updated and automatically distributed to other users associated with the Web application that is configured with the virtual card plug-in module. The back-end unit can be employed to keep track of the contact information in a database and provide management functions associated with the data via a Web services application programming interface. A hard copy version of the virtual card can also be rendered utilizing a variable data composition engine and a rendering technology.

18 Claims, 6 Drawing Sheets

METHOD AND SYSTEM FOR STORING AND DISTRIBUTING SOCIAL AND BUSINESS CONTACT INFORMATION ONLINE

TECHNICAL FIELD

Embodiments are generally related to networking systems and methods. Embodiments also relate in general to the field of computers and similar technologies and, in particular, to software utilized in this field. Embodiments additionally relate to the management and distribution of contact information over a network.

BACKGROUND OF THE INVENTION

Business cards typically contain information pertaining to an individual and an associated business entity. The information associated with the business cards usually includes a company name, an individual's name, title, phone number, facsimile number, mail address, e-mail address, and so forth. A business card thus records information that is needed to identify and contact the individual represented by the business card. Typically, business cards become outdated when the individual moves offices, change employers, obtain promotions, etc. As a result, inaccurate business cards remain in circulation long after being outdated. Another problem with conventional business cards is that the distribution of such cards is manual.

With the advent of the Internet, a large number of social and business networking websites have been developed and utilized extensively to connect people and business associates. Social and business networking systems connect users associated with the system to facilitate communications between users for business profile creation, job networking, service referrals, activity partners, and the like. A number of approaches have been conventionally employed to obtain social opportunities and information from such networks. Such approaches, however, do not provide an efficient mechanism for communicating personal contact information, nor the ability to quickly update and distribute updates, search for key contacts based on connections or referrals from others, rate connections, etc.

Based on the foregoing, it is believed that a need exists for an improved method and system for storing and distributing contact information over a network. A need also exists for automatically updating contact information with respect to a social and/or business network, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved data-processing method and system.

It is another aspect of the disclosed embodiments to provide for an improved method and system for automatically storing and distributing contact information over a network.

It is a further aspect of the disclosed embodiments to provide for an improved virtual card plug-in interface for updating contact information with respect to a social and business networking system.

The aforementioned aspects and other objectives and advantages can now be achieved as described herein. An information management and distribution method and system are disclosed herein. A plug-in associated with a cloud-based back-end unit interacts with a Web application for updating contact information over a network. A virtual card (e.g., connectcard) comprising a set of pluggable user interface components associated with the plug-in can be displayed in a user interface associated with the Web application (e.g., a social or business networking Web application). Contact information with respect to a user can be updated and automatically distributed to other users associated with the Web application that is configured with the virtual card plug-in module. The back-end unit can be employed to track contact information stored in a database and provide management functions associated with such data via a Web services API (Application Programming Interface). A hard copy version of the virtual card can also be rendered utilizing a variable data composition engine and appropriate rendering technology.

The database associated with the back-end unit stores and manages the updated information associated with a plurality of users. When the user adds additional information to the user profile, such as adding additional contacts, the user profile in the database may then be updated with the information added. The disclosed method and system enables users to create a variety of virtual cards such as, for example, a social card for a social networking website and/or a business card for a business networking website. The virtual card may then be shared with other users and information with respect to other users can be obtained.

A rating indicative of the services associated with the shared contact information can be promulgated in order to identify potential customers. The plug-in associated with the cloud-based back-end unit may be connected to one or more users through a communication network (e.g., the Internet) to permit each user to access, edit, and update a user's profile data. The user may select privacy settings, share contact information, provide tags, and so forth, for ease of search and retrieval of the contact information. Such an approach permits users to communicate contact information efficiently across large networks.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The disclosed embodiments may be employed for automatically updating and distributing contact information over a network. The contact information may include social and/or business contact information for identifying or contacting a user (e.g., person or entity). For example, the social contact information may include name, telephone number, facsimile number, mail address, and email address. The business contact information may include a title, business name, and a Universal Resource Locator (URL) to an associated business website. The approach described herein is capable of automatically updating previously distributed contact information.

Figure 1:
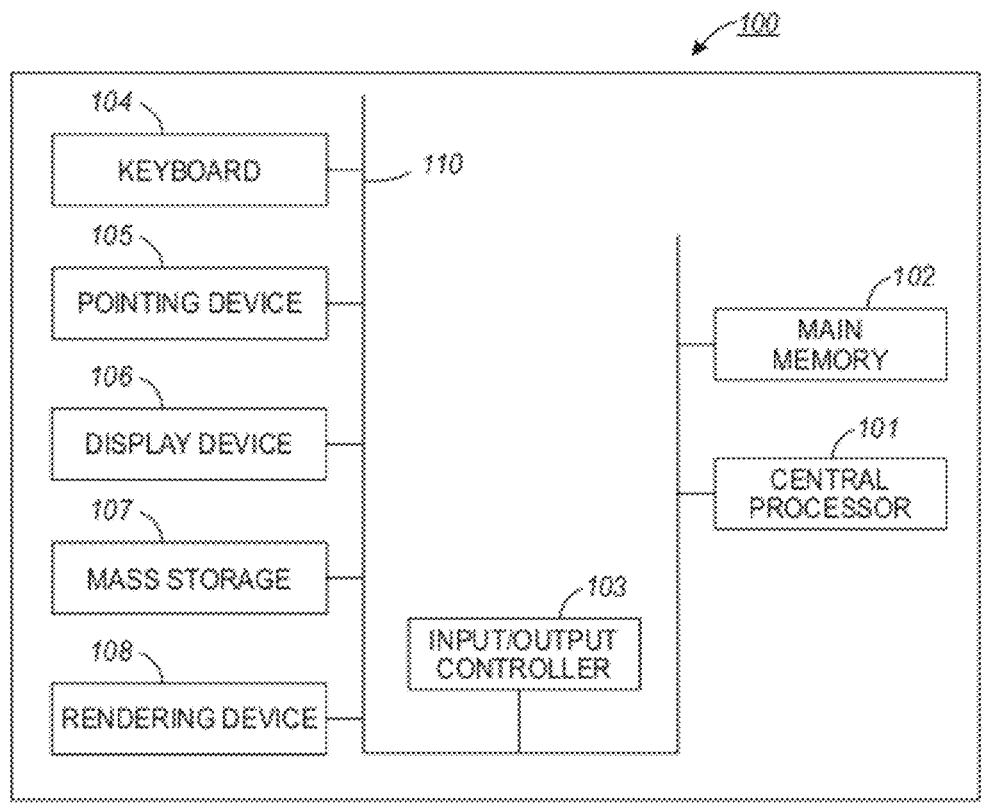
FIG. 1 illustrates a schematic view of a data-processing system in which an embodiment may be implemented.
Figure 2:
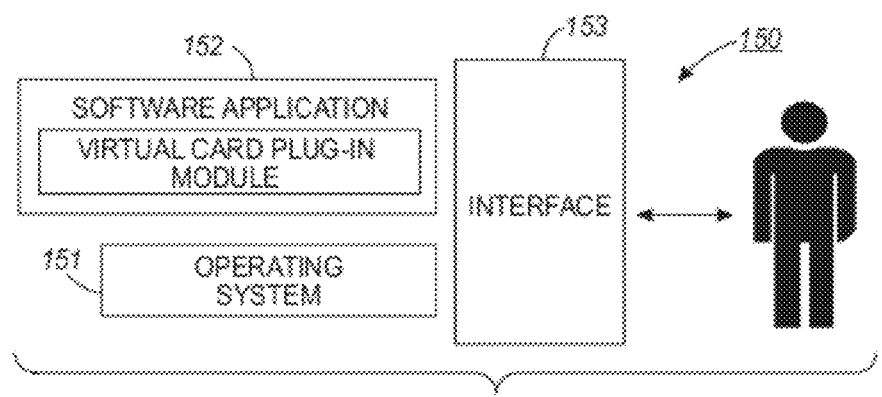
FIG. 2 illustrates a schematic view of a software system including an operating system, application software, and a user interface for carrying out an embodiment.
Figure 3:
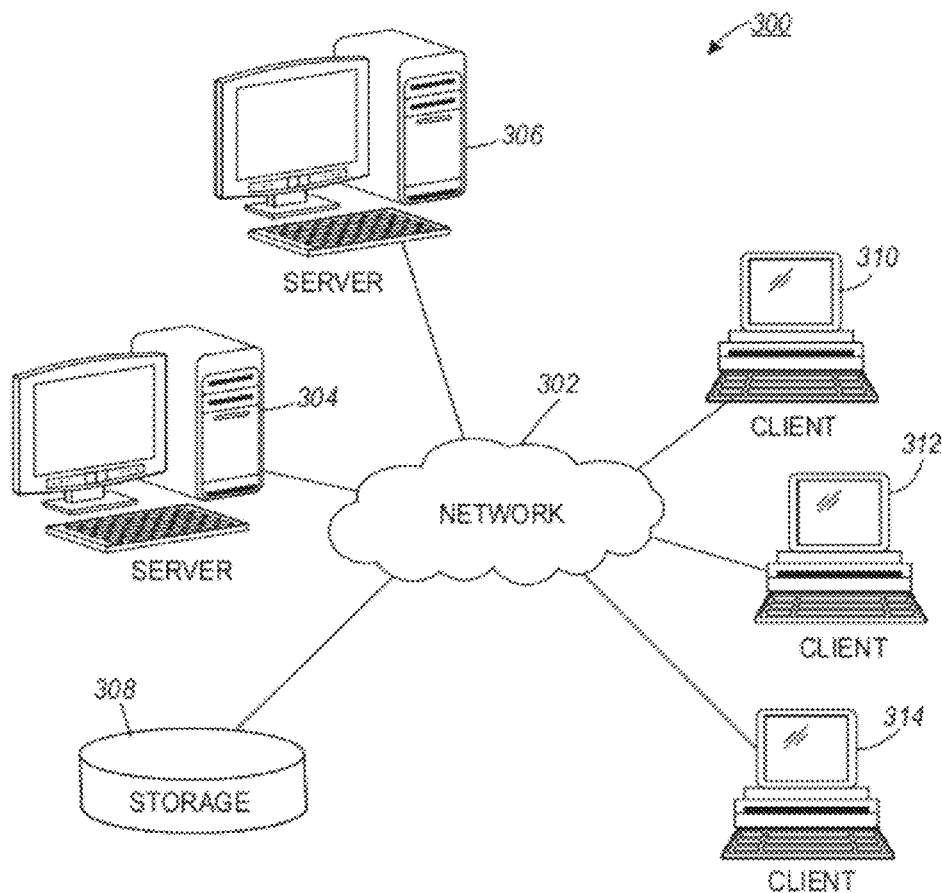
FIG. 3 illustrates a graphical representation of a network of data-processing systems in which aspects of the disclosed embodiments may be implemented.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the present invention.

As illustrated in FIG. 1, the disclosed embodiments may be implemented in the context of a data-processing system 100 comprising, for example, a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108 (e.g., printer, scanner, fax machine, etc), for example, may be associated with the data-processing system 100 as desired. As illustrated, the various components of data-processing system 100 communicate electronically through a system bus 110 or similar architecture. The system bus 110 may be a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 152, stored in main memory 102 and on mass storage 107, generally includes a kernel or operating system 151 and a shell or interface 153. One or more application programs, such as software application 152, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating module 151 and/or software application 152.

The following discussion is intended to provide a brief, general description of suitable computing environments in which the system and method may be implemented. Although not required, the disclosed embodiments will be described in the general context of computer-executable instructions, such as program modules, being executed by a single computer.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc. Such a module may also constitute a software application such as a "plug-in". Note that the term plug-in as utilized herein refers generally to a computer program that interacts with a host application (e.g., a Web browser) to provide a certain, usually very specific, function "on demand". The terms "plug-in" and "plug-in module" and "module" may be utilized interchangeably to refer to the same component or application.

The interface 153, which is preferably a graphical user interface (GUI), can serve to display results, whereupon a user may supply additional inputs or terminate a particular session. In some embodiments, operating system 151 and interface 153 can be implemented in the context of a "Windows" system. It can be appreciated, of course, that other types of operating systems and interfaces may be alternatively utilized. For example, rather than a traditional "Windows" system, other operation systems such as, for example, Linux may also be employed with respect to operating system 151 and interface 153. The software application 152 can include a virtual card plug-in module for automatically storing and distributing contact information over a network. The virtual card plug-in module updates contact information with respect to a social and business networking system. Software application module 152, on the other hand, can include instructions such as the various operations described herein with respect to the various components and modules described herein such as, for example, the method 500 depicted in FIG. 5. Note that the term "virtual" as utilized herein refers generally to something that is created, simulated, and/or carried on by means of a computer or computer network or other data-processing system.

FIG. 3 illustrates a graphical representation of a network of data-processing systems in which aspects of the disclosed embodiments may be implemented. Network data-processing system 300 is a network of computers in which embodiments of the present invention may be implemented. Network data-processing system 300 contains network 302, which is the medium used to provide communications links between various devices and computers connected together within network data-processing apparatus 300. Network 302 may include connections such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing system 100 depicted in FIG. 1 can be, for example, a client such as client 310, 312, and/or 314. Alternatively, data-processing system 100 can be implemented as a server such as servers 304 and/or 306, depending upon design considerations.

In the depicted example, server 304 provides data such as boot files, operating system images, and applications to clients 310, 312, and 314. Clients 310, 312, and 314 are clients to server 304 in this example. Network data-processing system 300 may include additional servers, clients, and other devices not shown. Specifically, clients may connect to any member of a network of servers which provide equivalent content.

In the depicted example, network data-processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data-processing system 300 also may be implemented as a number of different types of networks such as for example, an intranet, a local area network (LAN), or a wide area network (WAN). FIG. 1 is intended as an example and not as an architectural limitation for varying embodiments of the present invention.

The description herein is presented with respect to particular embodiments of the present invention, which may be embodied in the context of a data-processing system such as, for example, data-processing system 100 and computer software system 150 illustrated with respect to FIGS. 1-3. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms including Macintosh, UNIX, LINUX, and the like.

Figure 4:
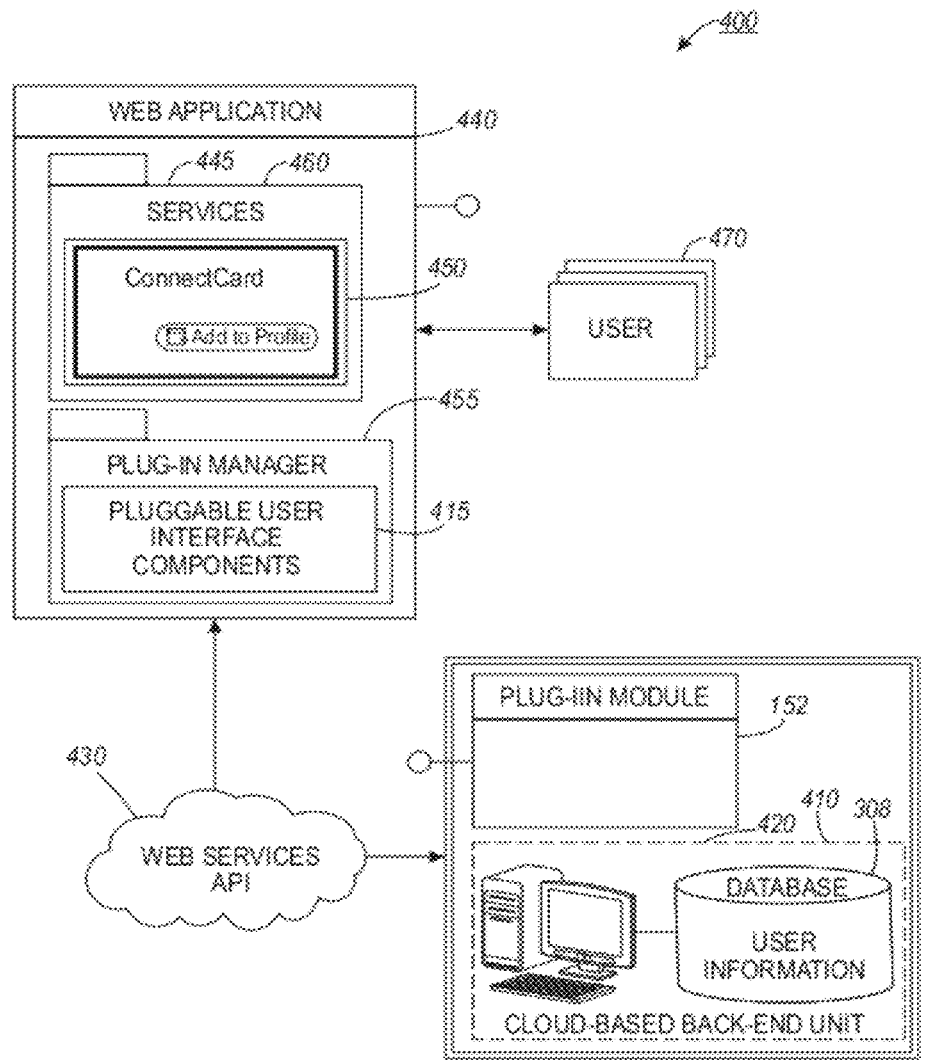
FIG. 4 illustrates a block diagram of an information management and distribution system associated with a virtual card plug-in module, in accordance with the disclosed embodiments.

FIG. 4 illustrates a block diagram of an information management and distribution system 400 associated with a virtual card plug-in module 152, in accordance with the disclosed embodiments. Note that in FIGS. 1-7, identical or similar blocks are generally indicated by identical reference numerals. The system 400 generally includes a cloud-based back-end unit 410 associated with the virtual card plug-in module 152 and a database 308.

Note that the use of the term "cloud" in this context refers generally to so-called "cloud computing," which is a paradigm of computing in which dynamically scalable and often virtualized resources are provided as a service over a network such as, for example, the Internet. Users need not have knowledge of, expertise in, or control over the technology infrastructure in the "cloud" that supports them. The concept of "the cloud" or "cloud computing" generally incorporates combinations such as, for example IaaS (Infrastructure as a Service), Paas (Platform as a Service), SaaS (Software as a Service) and/or other technologies that rely on the Internet to satisfy the computing and networking needs of users. Cloud computing services can provide common business applications online that are accessed from a Web browser, while the software and data are stored on associated servers. The term cloud can be thought of as a metaphor for the Internet based on how the Internet is depicted in computer network diagrams and is an abstraction for the complex infrastructure it conceals.

The plug-in module 152 associated with the cloud-based back-end unit 410 may be connected to one or more users 470 through a communications network 430, such as the Internet, to permit each user to access, edit, and update the user's profile data. The cloud-based back-end unit 410 keeps track of the contact information in the database 308 and provides management functions associated with the data via the Web services API (application programming interface) 430. A Web service may be defined as a software system designed to support interoperable machine-to-machine interaction over a network. Web services are frequently just Internet API that can be accessed over a network, such as the Internet, and executed on a remote system hosting the requested services. The application programming interface 430 provides a standard interface between the plug-in module 152 and a Web application 440.

Note additionally that the term "back-end" as utilized herein refers generally to a term utilized to characterize various interfaces or services. That is, front-end and back-end are terms used to characterize program interfaces and services relative to the initial user of these interfaces and services. (The "user" may be a human being or a program.) A "front-end" application is one that application users interact with directly. A "back-end" application or program serves indirectly in support of the front-end services, usually by being closer to the required resource or having the capability to communicate with the required resource. The back-end application may interact directly with the front-end or, perhaps more typically, is a program called from an intermediate program that mediates front-end and back-end activities.

The plug-in module 152 associated with the cloud-based back-end unit 410 interacts with the Web application 440 for updating contact information over the network 430. Note that the Web application 440 can be, for example, a social networking application or a business networking application. The application programming interface 430 provides a way for the plug-in module 152 to register themselves with the host Web application 440 and a protocol for the exchange of data with the plug-in module 152. The plug-in module 152 generally depends on the services provided by the Web application 440. The Web application 440 operates independently of the plug-in module 152, making it possible for end-users to add and update the plug-in module 152 dynamically without needing to make changes to the Web application 440. A plug-in manager 455 manages a set of pluggable user interface components 415 associated with the plug-in module 152 that is installed in the Web application 440.

A virtual card 450 (e.g., connectcard) comprising the set of pluggable user interface components 415 associated with the plug-in module 152 can be displayed in a user interface 460 associated with the Web application 440. Note additionally that the term "Web" or "Web application" as utilized herein generally refers to the "World Wide Web," which is the well-known system of interlinked hypertext documents accessed via the Internet. With a Web browser, for example, one can view Web pages that may contain text, images, videos, and other multimedia and navigate between them using hyperlinks. The contact information with respect to the user 470 can be updated and automatically distributed to other users associated with the Web application 440 that is configured with the virtual card plug-in module 152.

The database 308 associated with the back-end unit 410 can be employed for storing and managing the contact information associated with the user 470. For example, when the user 470 subscribes to services provided by the social Web application 440, a user profile may be generated for the user 470. The contact information associated with the user 470 of the Web application 440 can be supplied to the back-end unit 410 through the communications network 430. The user 470 may select privacy settings, provide contact information, or group other users according to one or more categories. The user 470 may add additional information to the user profile such as adding additional contacts, the user profile in the database 308 may be updated with the information added. Similarly, updated contact information from the back-end unit 410 may be supplied to other users associated with various Web applications that are configured with the virtual card plug-in module 152. The user profile may be stored, modified, added, and so forth to the database 308.

The system 400 enables users to create a variety of virtual cards such as, for example, a social card for a social networking website and a business card for a business networking website. The social networking websites assist in connecting friends, business partners, or other individuals together using a variety of tools. The websites typically offer an interactive, user-submitted network of profiles, blogs, groups, photos, videos, an internal e-mail system, etc. Examples of such websites are MySpace, Facebook, Bebo, Friendster, MyYearbook, Classmates, and Live Journal. The business networking website creates business opportunities through networks of like-minded business people. Such websites also permit the business person to build new business relationship and generate business opportunities at the same time.

A hard copy of the virtual card 450 may also be rendered utilizing a variable data composition engine and a rendering mechanism or device capable of communicating with one another. An example of such a rending device or mechanism is the rendering device 108 depicted in FIG. 1. The virtual card 450 associated with the user 470 can be shared with other users and information with respect to other users can be obtained. A rating indicative of the services associated with the shared contact information can be promulgated in order to identify potential customers. The user 470 may select privacy settings, share contact information, or tag users as favorite and so forth, for easier search and retrieval of the contact information.

Figure 5:
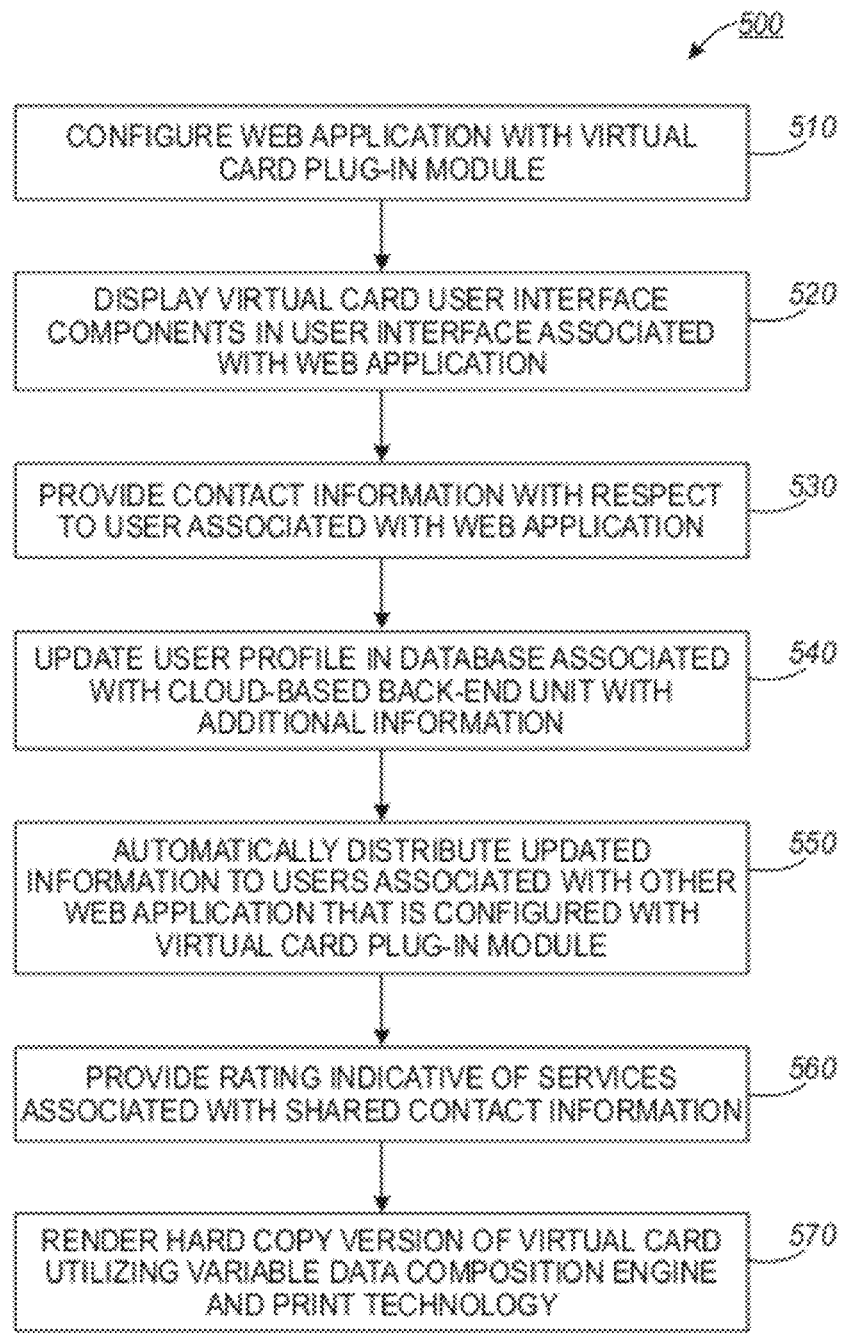
FIG. 5 illustrates a high-level flow chart of operations illustrating logical operational steps of a method for managing and distributing contact information over a network, in accordance with the disclosed embodiments.

FIG. 5 illustrates a high-level flow chart of operations illustrating logical operational steps of a method 500 for managing and distributing social and business contact information online, in accordance with the disclosed embodiments. Note that the logical operations of method 500 may be implemented as instructions in the context of a module such as those discussed herein. The method 500 can be implemented in the context of a computer-useable medium that contains a program product including, for example, a module or group of modules. The Web application 440 can be configured with the virtual card plug-in module 152, as depicted at block 510. The virtual card user interface components 415 can be displayed in association with the user interface 460 of the Web application 440, as indicated at block 520.

The contact information with respect to the user 470 associated with the Web application 440 can be provided, as depicted at block 530. Next, as illustrated at block 540, the user profile can be updated with additional information in the database 308 associated with cloud-based back-end unit 410. The updated information can be automatically distributed to users associated with other Web applications that are configured with the virtual card plug-in module 152, as indicated at block 550. A rating indicative of services associated with shared contact information can be provided, as depicted at block 560. A hard copy version of the virtual card 450 can be rendered utilizing the variable data composition engine and job submission technology (e.g., job ticket application), as illustrated at block 570.

For example, rendering can be efficiently accomplished utilizing a combination of XMPie and other job submission technologies. Note that XMPie is a software provider for dynamic publishing. XMPie generally integrates print and electronic media to create and generate personalized communications. Virtual card designs may be created in, for example, utilizing Adobe InDesign with variable fields marked as such utilizing XMPie uCreate technology. The template may then be uploaded to a host uProduce server. Upon a rendering request, the variable data may be passed to uProduce, attached to the template, and then submitted as a job to uProduce. The output of the job may then be, for example, a PDF file that is capable of being submitted via a job submission technology (e.g., job ticket application) to the rendering device.

Figure 6:
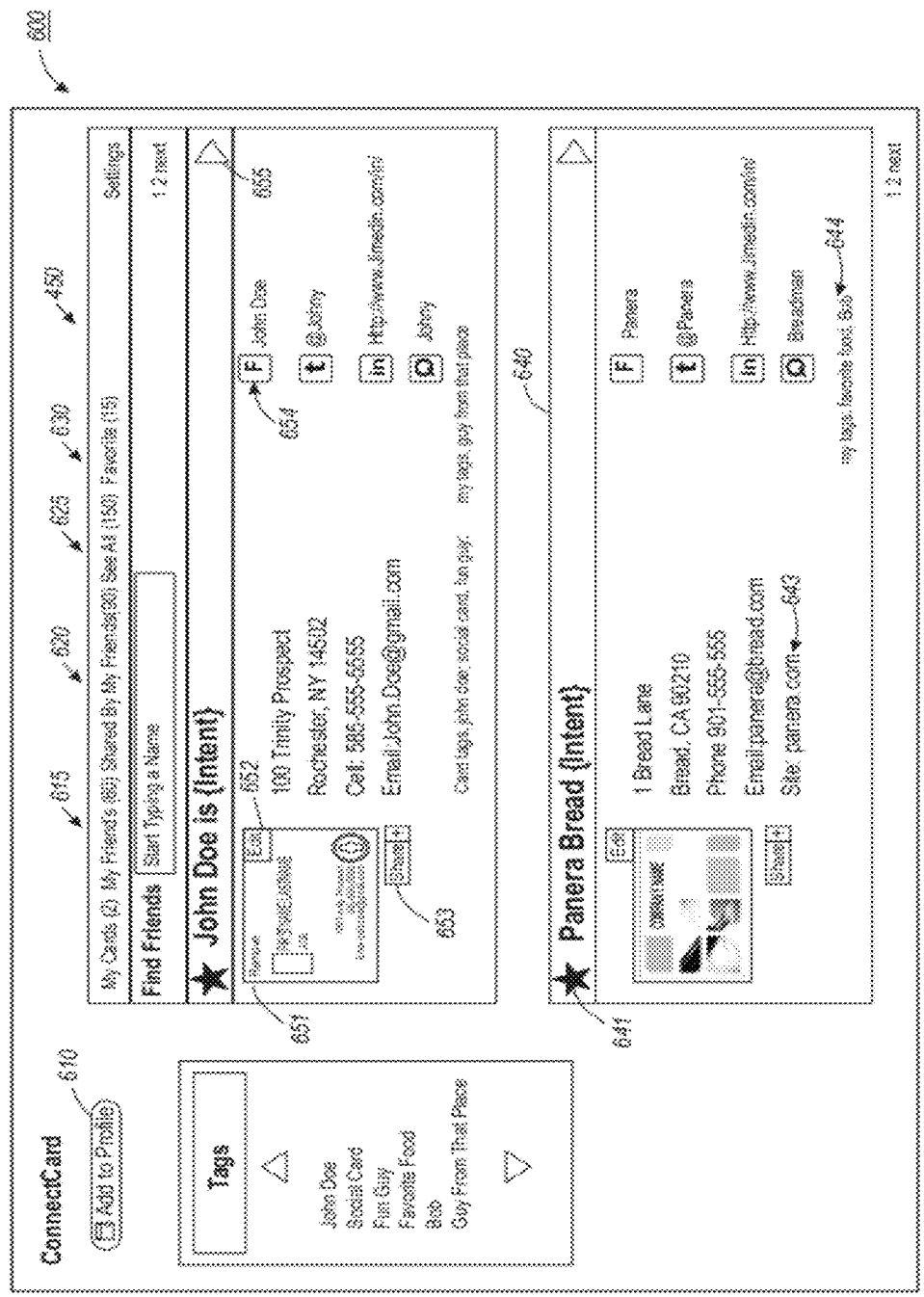
FIG. 6 illustrates a GUI of a virtual card associated with a Web application, in accordance with the disclosed embodiments.

FIG. 6 illustrates a diagram of a GUI 600 of the virtual card 450 associated with a Web application, in accordance with the disclosed embodiments. Note that the GUI 600 and/or 700 may be implemented utilizing a GUI such as, for example, the GUI 153 depicted in FIG. 1 herein, and may be provided by a module such as, for example, module 152 (i.e., a software application). GUI 600 and/or 700 can be displayed via a display device such as monitor 106 depicted in FIG. 1. In the illustrated figures herein, GUI 600 and 700 are generally implemented in the context of a GUI "window". Note that in computing, a GUI window is generally a visual area containing some type of user interface (e.g., GUI 153). Such a "window" usually (but not always) possesses a rectangular shape and displays the output of and may allow input to one or more processes. Such windows are primarily associated with graphical displays, where they can be manipulated with a mouse cursor such as, for example, the pointing device 105 depicted in FIG. 1. A GUI using windows as one of its main "metaphors" is often referred to as a windowing system.

The virtual card 450 may be implemented in association with the Web application 440 such as, for example, Facebook. GUI 600 permits the users 470 to add his/her online profile by accessing add to profile button 610. The virtual card 450 may include social information associated with the user such as, for example, telephone number, facsimile number, mail address, and email address. The virtual card 450 may further include business contact information 640 such as, for example, a title, business name, and a URL 643 (Universal Resource Locator) to an associated business website. If the user 470 possesses more than one card, the user 470 may view the card utilizing a graphically displayed scroll button 655.

The profile entered by the user 470 can be stored in the database 308 associated with the back end unit 410. The user 470 can view cards associated with their friends or groups and cards shared by the friends by accessing icons 615 and 620. If the user 470 "clicks" the icon 615 and 620, the GUI 600 can provide social information and business information 640 associated with that particular user. The Web application 440 permits the users 470 to associate themselves with other users, thus creating a Web of connections among the users 470 of the social networking website. These connections among the users can be exploited by the website to offer more relevant information to each user in view of the users' own stated interests in their connections.

Additionally, the user 470 can view all cards associated with the members of the networking website and the user favorite cards by accessing icons 625 and 630. The user 470 can remove, edit, or share the contact information by accessing icons 651, 652, and 653, respectively. The favorite user may be indicated by graphically displayed windows icon 641 having varying colors. The GUI 600 may include a graphically displayed message box 644 that includes GUI controls that permit the user 470 to edit tags associated with the card. The tags are intended to be keywords describing the contact and/or the relationship between the contact and the user making the tag annotation. The virtual card 450 can be shared with other Web application configured with the plug-in module 152 by accessing the hyper text links 654. The business/social card associated with social and business networks can be employed for a social media campaign development. For example, a potential campaign that runs on a Facebook page of a client may encourage end-users to "drop" their digital business card to participate in a contest or to receive more info on a product or service. Such an approach permits users for much more intimate conversations with potential customers.

Figure 7:
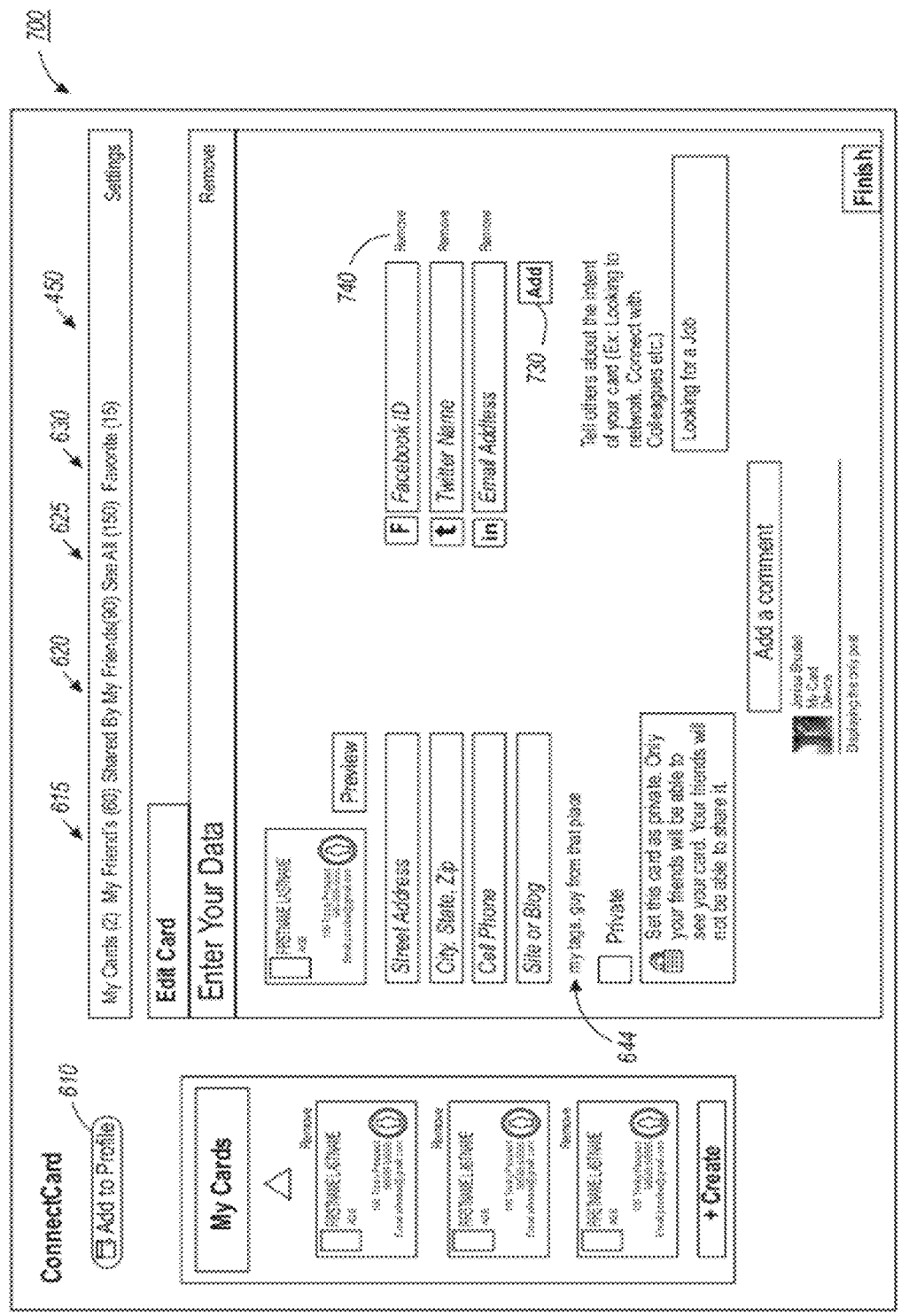
FIG. 7 illustrates a GUI of the virtual card for providing contact information with respect to a user, in accordance with the disclosed embodiments.

FIG. 7 illustrates a diagram of a GUI 700 associated with the virtual card 450 for providing contact information associated with the user 470, in accordance with the disclosed embodiments. The contact information associated with the user 470 can be entered into one or more graphically displayed text boxes that can include, for example, GUI controls. The user 470 may enter contact information such as, for example, street address, city, state, zip code, phone number, website, blog and so forth. The user 470 may choose to display additional information on the GUI 700. Such additional information may be displayed generally or may be limited to specific users by access control criteria. The contact information entered by the user 470 can be previewed by accessing, for example, a graphically displayed preview button, which can permit a user to preview the card.

Additionally, GUI 700 may include an icon 730 to add one or more configurable social network websites. The icon and website address for each social network can be selected via a pop-up window which can be implemented utilizing programming methodologies such as an "Ajax" control. Note that, as utilized herein, "Ajax" is a group of interrelated Web development techniques utilized on a client-side to create interactive Web applications or rich Internet applications. If the user "clicks" the icon 730, the pop-up window provides the social networks with the website address and icon for each address. The social networks can be removed from the virtual card 450 by accessing the icon 740. Such automatic synchronization permits users to communicate information across large networks in a matter of seconds and can be extended to mobile device phone books for automatic updates. In addition, the users can be able to state the intent of the card (e.g., looking for a job, looking for collaborators on nanotube elevator, etc.) and make the intent visible to other users who receive the card(s). The disclosed embodiment can therefore permit users to communicate contact information across large networks.

Based on the foregoing, it can be appreciated that one embodiment is directed generally toward an information management and distribution method. Such a method generally includes associating a plug-in with a back-end unit to interact with a network application for distributing profile data over a network, wherein the network application communicates with the network, and configuring a virtual card comprising a plurality of pluggable interface components associated with the plug-in. Such a method can also include updating the profile data with respect to a particular user in order to generate updated profile data from the profile data and thereafter automatically distribute the updated profile data to a plurality of users associated with the network application, wherein the network application (e.g., a Web application) is configured with the plug-in.

Additionally, in a variation to such a method, another embodiment can include associating a database with the network, wherein the database communicates with the network, configures the back-end unit to track the profile data in the database, and manages the profile data via an application programming interface. Additionally, such a method in another embodiment may include storing the updated profile data in a database associated with the back-end unit.

Such a method can also include rendering a hard copy of the virtual card associated with the profile data utilizing a variable data composition engine and a rendering mechanism, wherein the rendering mechanism and the variable data composition engine communicate with one another. Additional method steps can include: providing a rating indicative of services associated with the profile data in order to identify a potential customer; authorizing at least one user among the plurality of users to access the virtual card and edit and update the profile data; providing a tag with respect to the profile data associated with the virtual card; and/or marking the virtual card for ease of search and retrieval of the profile data, including the updated profile data.

In the context of such embodiments the profile data can be configured to include, but not limited to, social contact data and/or business contact data. The aforementioned network application can include, for example, a social networking Web application and/or a business networking Web application.

It can be further appreciated, based on the foregoing, that another embodiment is directed generally toward an information management and distribution system. Such a system includes, for example, a plug-in associated with a back-end unit to interact with a network application for distributing profile data over a network, wherein the network application communicates with the network. In the context of such a system, a user interface can be associated with the network application. Additionally, a virtual card can be configured, which includes a plurality of pluggable interface components associated with said plug-in, wherein said profile data is updated with respect to a particular user in order to generate updated profile data from said profile data and thereafter automatically distribute said updated profile data to a plurality of users associated with said network application, wherein said network application is configured with said plug-in.

In some embodiments, such a system can include a database associated with the network, wherein the database communicates with the network, wherein the back-end unit tracks the profile data in the database and manages the profile data via an application programming interface. Such a database or another storage means may be utilized to store the updated profile date. Such a database or storage means can be associated with a database associated with the back-end unit. Additionally, in other embodiments of such a system, a variable data composition engine can be provided that communicates with a rendering mechanism such that a hard copy of the virtual card associated with the profile data can be rendered utilizing the variable data composition engine and the rendering mechanism.

Additionally, a rating module (e.g., software application) can be configured as a part of such a system, which calculates and generates a rating that is indicative of services associated with the profile data in order to identify a potential customer. In the context of the same or other embodiments of such a system, a module (e.g., software) can be employed, which authorizes at least one user among the plurality of users to access the virtual card and edit and update the profile data.

In other embodiments of such a system, a tag can be provided with respect to the profile data associated with the virtual card. Additionally, a marker can be employed for marking the virtual card for ease of search and retrieval of the profile data, including the updated profile data. In the context of such embodiments, the profile data can be configured to include, for example, social contact data and/or business contact data. Additionally, the network application can be, for example, a social networking Web application and/or a business networking Web application.

It can be further appreciated that variations to the above-referenced system can be implemented. In such alternative embodiments, an information management and distribution system can be provided, which includes a processor, a data bus coupled to the processor, and a computer-usable medium embodying computer code, the computer-usable medium coupled to the data bus. Such a computer program code (e.g., a software application, software module(s), etc.) can include: instructions executable by the processor and configured for associating a plug-in with a back-end unit to interact with a network application for distributing profile data over a network, wherein the network application communicates with the network; configuring a virtual card comprising a plurality of pluggable interface components associated with the plug-in; and updating the profile data with respect to a particular user in order to generate updated profile data from the profile data and thereafter automatically distribute the updated profile data to a plurality of users associated with the network application, wherein the Web application is configured with the plug-in. Additionally, such instructions can be further configured, for example, for associating a database with the network, wherein the database communicates with the network and configuring the back-end unit to track the profile data in said database and manage the profile data via an application programming interface.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. An information management and distribution method, said method comprising:
    associating a plug-in with a back-end unit to interact with a network application for distributing profile data over a network, wherein said network application communicates with said network, wherein said network comprises a social network or a business network;
    configuring a virtual card comprising a plurality of pluggable interface components associated with said plug-in, wherein said virtual card is configurable with a tagged intent of said virtual card and said tagged intent is communicated across said network;
    providing a rating indicative of services associated with said profile data to identify a potential customer; and
    updating said profile data with respect to a particular user in order to generate updated profile data from said profile data and thereafter automatically distribute said updated profile data to a plurality of users associated with said network application, wherein said network application is configured with said plug-in.

2. The method of claim 1 further comprising:
    associating a database with said network, wherein said database communicates with said network; and
    configuring said back-end unit to track said profile data in said database and manage said profile data via an application programming interface.

3. The method of claim 1 further comprising storing said updated profile data in a database associated with said back-end unit.

4. The method of claim 1 further comprising rendering a hard copy of said virtual card associated with said profile data utilizing a variable data composition engine and a rendering mechanism, wherein said rendering mechanism and said variable data composition engine communicate with one another.

5. The method of claim 1 further comprising authorizing at least one user among said plurality of users to access said virtual card and edit and update said profile data.

6. The method of claim 1 further comprising:
    providing a tag with respect to said profile data associated with said virtual card; and
    marking said virtual card for ease of search and retrieval of said profile data, including said updated profile data.

7. The method of claim 1 further comprising configuring said profile data to comprise at least one of the following types of data:
    social contact data; and
    business contact data.

8. The method of claim 1 wherein said network application comprises at least one of the following types of applications:
    a social networking Web application; and
    a business networking Web application.

9. An information management and distribution system, said system comprising:
    a processor;
    a data bus coupled to said processor;
    a computer-usable non-transitory storage medium storing computer program code, said computer program code comprising program instructions executable by said processor;
    a plug-in associated with a back-end unit to interact with a network application for distributing profile data over a network, wherein said network application communicates with said network, wherein said network application comprises a social network or a business network;
    a user interface associated with said network application;
    a rating module for providing a rating indicative of services associated with said profile data in order to identify a potential customer; and
    a virtual card comprising a plurality of pluggable interface components associated with said plug-in, wherein said virtual card is configurable with a tagged intent of said virtual card and said tagged intent is communicated across said network, wherein said profile data is updated with respect to a particular user in order to generate updated profile data from said profile data and thereafter automatically distribute said updated profile data to a plurality of users associated with said network application, wherein said network application is configured with said plug-in.

10. The system of claim 9 further comprising:
    a database associated with said network, wherein said database communicates with said network, wherein said back-end unit tracks said profile data in said database and manages said profile data via an application programming interface.

11. The system of claim 9 further comprising a database for storing said updated profile data, wherein said database is associated with said back-end unit.

12. The system of claim 9 further comprising:
a variable data composition engine; and
a rendering mechanism that communicates electronically with said variable data composition engine, wherein a hard copy of said virtual card associated with said profile data is rendered utilizing said variable data composition engine and said rendering mechanism.

13. The system of claim 9 further comprising a module for authorizing at least one user among said plurality of users to access said virtual card and edit and update said profile data.

14. The system of claim 9 further comprising:
a tag with respect to said profile data associated with said virtual card; and
a marker for marking said virtual card for ease of search and retrieval of said profile data, including said updated profile data.

15. The system of claim 9 wherein said profile data comprises at least one of the following types of data:
social contact data; and
business contact data.

16. The system of claim 9 wherein said network application comprises at least one of the following types of applications:
a social networking Web application; and
a business networking Web application.

17. An information management and distribution system, said system comprising:
a processor;
a data bus coupled to said processor; and
a computer-usable medium embodying computer code, said computer-usable medium being coupled to said data bus, said computer program code comprising instructions executable by said processor and configured for automatically:
associating a plug-in with a back-end unit to interact with a network application for distributing profile data over a network, wherein said network application communicates with said network, wherein said network comprises a social network;
configuring a virtual card comprising a plurality of pluggable interface components associated with said plug-in, wherein said virtual card is configurable with a tagged intent of said virtual card and said tagged intent is communicated across said network;
updating said profile data with respect to a particular user in order to generate updated profile data from said profile data and thereafter automatically distribute said updated profile data to a plurality of users associated with said network application;
providing a rating indicative of services associated with said profile data to identify a potential customer; and
configuring said network application with said plug-in.

18. The system of claim 17 wherein said instructions are further configured for:
associating a database with said network, wherein said database communicates with said network; and
configuring said back-end unit to track said profile data in said database and manage said profile data via an application programming interface.

\* \* \* \* \*